UNITED STATES PATENT OFFICE.

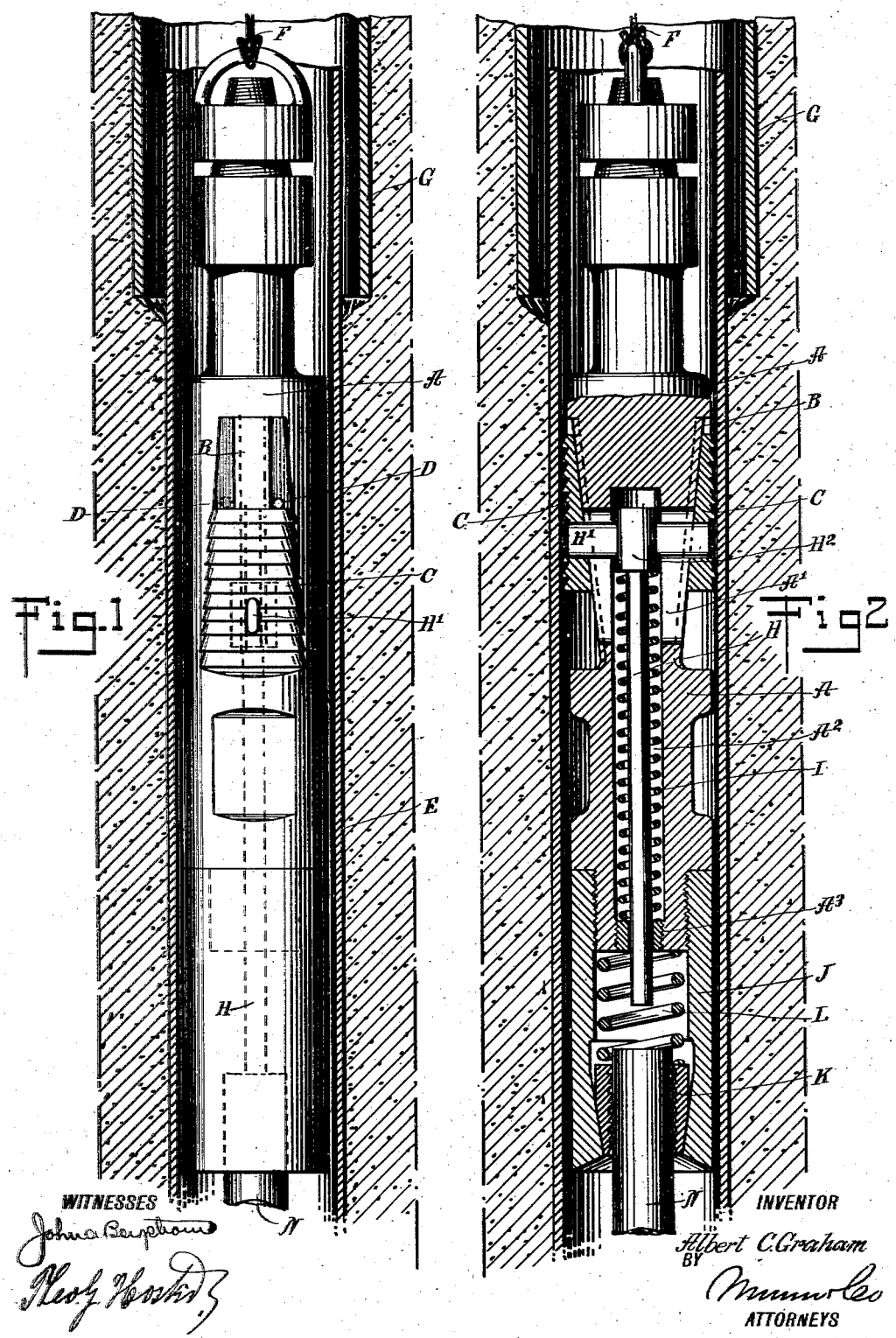

ALBERT C. GRAHAM, OF OILFIELDS, CALIFORNIA.

TOOL-FISHING APPARATUS.

967,759.  Specification of Letters Patent.  Patented Aug. 16, 1910.

Application filed November 11, 1909. Serial No. 527,399.

*To all whom it may concern:*

Be it known that I, ALBERT C. GRAHAM, a citizen of the United States, and a resident of Oilfields, in the county of Fresno and State of California, have invented a new and Improved Tool-Fishing Apparatus, of which the following is a full, clear, and exact description.

The object of the invention is to provide a new and improved tool fishing apparatus for use in oil and similar wells, and arranged to insure an automatic release of the gripping jaws by the action of the tools to be fished out. For the purpose mentioned the gripping device on the carrier is held by fragile frangible means in an inactive position, and a releasing means is connected with the gripping device and is adapted to be actuated by the tool to be fished for, to release the gripping device.

A practical embodiment of the invention is represented in the accompanying drawings forming a part of this specification, in which similar characters of reference indicate corresponding parts in both views.

Figure 1 is a side elevation of the tool fishing apparatus, showing the jaws in inactive, non-gripping position within the casing, the latter being shown in section; and Fig. 2 is a transverse section of the same and showing the jaws released and in gripping engagement with the casing.

When using the tool fishing apparatus, such, for instance, as disclosed in the Letters Patent of the United States, No. 571,279, granted to G. L. McKain, November 10, 1896, it frequently happens that the jaws or gripping slips are not released, and hence the fishing tool engaged with the drilling tools remains in the well on withdrawing the casing. In the McKain device referred to, the slips are held in an inactive position by a string, and when the drilling tool is caught then the carrier is drawn upward into the casing and the fishing apparatus is attached, with a view to break the string. This operation is frequently ineffective; that is, the string is not broken and the slips are not released, and hence on withdrawing the casing the drilling tool and the fishing apparatus remain in the well and are lost. With my improvement, presently to be described in detail, the jaws are positively released by the action of the drilling tool on taking hold of the same by the fishing apparatus, and an exceedingly firm gripping of the casing by the jaws takes place, and hence when the casing is withdrawn the fishing apparatus and the drilling tool are carried along.

The carrier A of the fishing apparatus is preferably made from a single piece of metal, and is provided on opposite sides with tapering seats B, on which slide the jaws or slips C, having serrated faces, as plainly indicated in the drawings. The jaws C are normally held in a lowermost or inactive position by fragile frangible pins D, of wood or other suitable material, inserted in openings in the carrier A directly above the jaws C, at the time the latter are in a lowermost position, as indicated in Fig. 1. Thus when the jaws C are in this lowermost, inactive position the carrier A can be readily let down in the casing E by the usual cable F attached to the upper end of the carrier A, it being understood that the said carrier A is lowered beyond the lower end of the tubing G, as indicated in Figs. 1 and 2.

The jaws C are attached to the ends of a transverse pin H' held on the upper end of a releasing rod H, mounted to slide within the carrier A and projecting beyond the lower end thereof, as plainly indicated in the drawings, the pin H' extending through an elongated slot A' formed in the carrier A, while the releasing rod H extends within a bore $A^2$ and slides in a bushing $A^3$ held in the lower end of the carrier A. A spring I is arranged within the bore $A^2$ and rests with its lower end on the bushing $A^3$, and the upper end of the spring presses against the head $H^2$ of the rod H, so as to force the jaws C, C upward into gripping engagement with the casing E after the pins D are broken and the jaws are released.

The lower end of the carrier A is provided with a suitable fishing tool for engagement with the drilling tool to be fished for, the said fishing tool, as shown in the drawings, consisting of a socket J screwed on the lower end of the carrier A, and containing gripping jaws K, pressed on by a spring L and adapted to engage the upper end of the drilling tool N to be fished for. Now when the carrier A is lowered in the casing E with the jaws C held in inactive position by the pins D and the drilling tool N passes into the socket J, it engages the lower end of the rod H and pushes the same upward, and in doing so the upper ends of the jaws C break or cut off the pins D, whereby the jaws C are released and slide upward by the action of the spring I, whereby the jaws move into firm gripping engagement with the casing E, as indicated in Fig. 2. As soon as this takes place, the cable F is cut and the casing E is withdrawn from the well and with it the carrier A and the tool N held in position by the jaws K in the clutch J attached to the lower end of the carrier A.

From the foregoing it will be seen that the jaws C are automatically released by the drilling tool N actuating the releasing rod H connected by the cross pin H' with the jaws C. It will also be noticed that by the arrangement described, a comparatively strong spring I may be employed, to force the jaws C into gripping position and to hold the same therein during the withdrawal of the casing E.

Having thus described my invention, I claim as new and desire to secure by Letters Patent:

1. A tool fishing apparatus, provided with a gripping device, fragile frangible means for normally holding the said gripping device in an inactive position, and releasing means connected with the said gripping device and adapted to be actuated by the tool to be fished for, to release the said gripping device.

2. A tool fishing apparatus, provided with spring-pressed movable jaws, fragile frangible means for normally holding the said jaws in an inactive position, and a releasing rod connected with the said jaws and adapted to be actuated by the tool to be fished for, to cause the jaws to break the fragile means and thus release the jaws.

3. A tool fishing apparatus, provided with a carrier having at its inner lower end means for engagement with the drilling tool, jaws mounted to slide on the said carrier, fragile frangible means for holding the jaws in inactive position, and a releasing means connected with the said jaws and adapted to be actuated by the drilling tool.

4. A tool fishing apparatus, comprising a carrier having tapering seats, jaws for gripping the tool sliding on the said seats, and a releasing rod connected with the said jaws for moving them on the seats and adapted to be actuated by the tool to be fished for.

5. A tool fishing apparatus, comprising a carrier having tapering seats, jaws sliding on the said seats, and a movable releasing rod within the said carrier and having a cross pin engaging the said jaws, the lower end of the said rod being adapted to be engaged and moved by the tool to be fished for to move the jaws on the seat.

6. A tool fishing apparatus, comprising a carrier having tapering seats, jaws sliding on the said seats, a releasing rod within the said carrier and having a cross pin engaging the said jaws, the lower end of the said rod being adapted to be engaged by the tool to be fished for, and fragile frangible pins held on the said carrier and engaging the said jaws to normally hold the jaws in an inactive position.

7. A tool fishing apparatus, comprising a carrier having tapering seats, jaws sliding on the said seats, a releasing rod within the said carrier and having a cross pin engaging the said jaws, the lower end of the said rod being adapted to be engaged by the tool to be fished for, fragile pins held on the said carrier and engaging the said jaws to normally hold the jaws in an inactive position, and a spring within the said carrier and pressing the said releasing rod.

8. A tool fishing apparatus comprising a carrier having inclined seats and jaws for gripping the casing slidable on the seats, a releasing rod connected with the jaws for moving them on the seats, said rod extending below the carrier in position for engagement by the tool and frangible means normally holding the jaws in inoperative position and adapted to be broken when the releasing rod is engaged and moved by the tool.

In testimony whereof I have signed my name to this specification in the presence of two subscribing witnesses.

ALBERT C. GRAHAM.

Witnesses:
R. S. FINE,
D. HEGGIE.